US 6,637,735 B2

(12) United States Patent
Monson et al.

(10) Patent No.: US 6,637,735 B2
(45) Date of Patent: Oct. 28, 2003

(54) DOUBLE TRIAD ELASTOMER MOUNT

(75) Inventors: Robert James Monson, St. Paul, MN (US); Trevor J. McCollough, Minneapolis, MN (US); Richard L. Cellini, Burnsville, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/779,423

(22) Filed: Feb. 8, 2001

(65) Prior Publication Data
US 2002/0105124 A1 Aug. 8, 2002

(51) Int. Cl.[7] .................................................. F16F 1/36
(52) U.S. Cl. ........................................ 267/141; 267/153
(58) Field of Search .............................. 267/140, 140.3, 267/141, 145, 153, 140.11, 140.4, 292, 294

(56) References Cited

U.S. PATENT DOCUMENTS

| 3,563,525 | A | * | 2/1971 | Narabu | ........................ 267/140 |
| 4,059,254 | A | | 11/1977 | Fielding-Russel et al. | .. 267/140 |
| 4,601,611 | A | * | 7/1986 | Tagomori et al. | ........... 114/219 |
| 4,691,926 | A | * | 9/1987 | Adam | ........................ 473/552 |
| 4,988,083 | A | * | 1/1991 | Bradley | ..................... 114/219 |
| 5,102,107 | A | * | 4/1992 | Simon et al. | ............... 248/621 |
| 5,180,147 | A | * | 1/1993 | Andersson et al. | ......... 188/379 |
| 5,330,165 | A | * | 7/1994 | van Goubergen | ........... 248/633 |
| 5,558,314 | A | * | 9/1996 | Weinstein | .................... 267/142 |
| 5,766,720 | A | | 6/1998 | Yamagishi et al. | ........... 428/71 |
| 6,029,962 | A | * | 2/2000 | Shorten et al. | .............. 267/145 |
| 6,174,587 | B1 | * | 1/2001 | Figge, Sr. | ................... 181/290 |

FOREIGN PATENT DOCUMENTS

EP          0 421 540     *    4/1991

* cited by examiner

Primary Examiner—Jack Lavinder
Assistant Examiner—Bradley King
(74) Attorney, Agent, or Firm—Patrick M. Hogan; Glenn W. Bowen

(57) ABSTRACT

A shock isolator for a housing in an offset compressive axis with the shock isolator including either an elastomer triad or a hollow elastomer tetrahedron with each having support surfaces thereon that are laterally offset from each other to prevent direct axial compression with each of the shock isolators providing shock and vibration attenuation not normally obtainable in a direct axially compression condition.

12 Claims, 5 Drawing Sheets

DOUBLE TRIAD ELASTOMER MOUNT

FIELD OF THE INVENTION

This invention relates to shock isolators and, more specifically, to shock isolators that can simultaneously provide compressive support without reliance on a direct axial compressive path through the isolator material.

BACKGROUND OF THE INVENTION

Various elastomeric materials have been used, or suggested for use, to provide shock and/or vibration damping as stated in U.S. Pat. No. 5,766,720, which issued on Jun. 16, 1998 to Yamagisht, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones. The particular type of elastomeric material is not critical but urethane material sold under the trademark Sorbothane® is currently employed. Suitable material is also sold by Aero E.A.R. Specialty Composites, as Isoloss VL. The registrant of the mark Sorbothane® for urethane material is the Hamiltion Kent Manufacturing Company (Registration No. 1,208,333), Kent, Ohio 44240.

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,776,720. These elastomeric isolators are typically attached to a housing to protect equipment within the housing from the effects of shock and vibration.

The prior art elastomeric isolators are generally positioned to rely on an axial compression of the elastomeric material or on tension or shear of the elastomeric material. Generally, if the elastomeric isolator is positioned in the axial compressive mode the ability of the elastomeric isolator to attenuate shock and vibration is limited by the compressive characteristics of the material. On the other hand, in the axial compressive mode the elastomeric isolators can be used to provide static support to a housing, which allows a single elastomeric isolator to be placed beneath the housing to support the static weight of the housing.

In general, if the elastomeric isolators are positioned in the shear or tension mode as opposed to an axial compression mode the elastomeric isolators provide better shock and vibration attenuating characteristics in response to dynamic forces due to shock and vibration. Unfortunately, elastomeric isolators, which operate in a shear or tension mode or in the axial compression mode, can generally not be placed beneath a housing to provide static support to the housing without substantially effecting the shock and vibration attenuation characteristics of the elastomeric isolators. Consequently, to provide static support for a housing, as well as effective shock and vibration attenuation characteristics the elastomeric isolators, which operate in the shear or tension mode, are generally placed along side or above a housing so that the elastomeric isolators can function in a shear or tension mode while tensionally supporting the static weight of the housing. The positioning in a shear or tension mode can require placing matching elastomeric isolators on each side of the housing. In contrast, the present invention provides an elastomeric isolator that provides axial offset compressive support for a housing. As the present invention does not require paring with other elastomeric isolators a single elastomeric isolator can be placed beneath a housing to provide static support for the housing through an axial offset compressive axis while at the same time allowing the elastomeric isolator to retain the necessary dynamic attenuation characteristics to thereby effectively reduce shock and vibration to the housing.

DESCRIPTION OF THE PRIOR ART

U.S. Pat. No. 4,059,254 shows an energy absorbing unit comprising an elastomeric member arranged in a trapezoidal configuration. A sliding piston is incorporated in the unit which has limited displacement due to a pin that slides within a elongated slot.

SUMMARY OF THE INVENTION

A triad shock isolator having a triad of elastomer legs that coact to cantileverly support the weight of a housing though an axial offset compressive axis while at the same time effectively attenuating shock or vibration imparted to the housing or in an alternate embodiment a tetrahedron isolator having a cavity therein with the tetrahedron isolator having an axial offset compressive axis to cantileverly support a housing while at the same time effectively attenuating shock and vibration imparted to the housing.

DESCRIPTION OF THE PREFERRED EMBODIMENT

Figure 1:
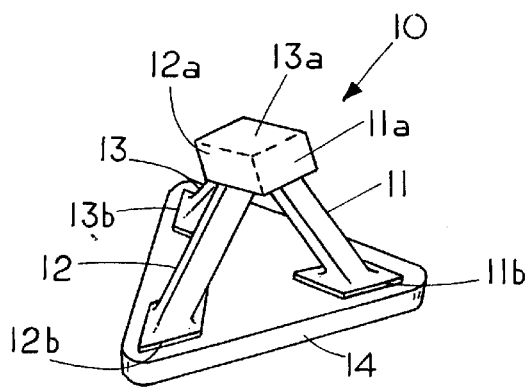
FIG. 1 is a perspective view of a triad shock isolator for providing offset support and shock isolation.

FIG. 1 shows a perspective view of a triad shock isolator 10 for simultaneously isolating shocks and for supporting a static load in an axially offset compression mode. The triad shock isolator includes a first elastomer leg 11 having a first top support surface 11a on a first end and a second bottom support surface 11b on a second end with first leg 11 angularly positioned therebetween. The first top support surface 11a, which is joined with adjacent top support surfaces and whose boundary is indicated by dotted lines, is laterally positioned from adjacent top support surfaces of elastomer legs 12 and 13. That is, the top support surface 11a is laterally positioned from the second bottom support surface 11b (see also FIG. 4) to provide an axial offset compressive support so that a force normal to first support surface 11a is cantileverly transmitted to second support surface 11b through leg 11.

Located in a conjoining condition with top support surface 11a is a second top support surface 12a, whose interior boundary is indicated by dotted lines, and a second bottom support surface 12b on a second end with a second leg 12 angularly positioned therebetween. Similarly, the top support surface 12a is laterally positioned from the second bottom support surface 12b to provide an axial offset compressive support so that a force normal to first support surface 12a is cantileverly transmitted to second support surface 12b through leg 12. First support surface 11a and second support surface 12a are shown in a complementary position with each extending approximately 120 degrees.

Located in a conjoining position with the elastomer legs 11 and 12 is a third elastomer leg 13 of the triad 10. Elastomer leg 13 has a first support surface 13a whose interior boundary is indicated by dotted lines, on a first end and a second support surface 13b on a second end with the third leg 13 angularly positioned therebetween. Likewise the top support surface 13a is laterally positioned from the second bottom support surface 13b to provide an axial offset compressive support so that a force normal to first top support surface 13a is cantileverly transmitted to second bottom support surface 13b through leg 13.

In the embodiments shown, the top surfaces 11a, 12a and 13a are joined to each other to form a continuous support surface that is centrally positioned with regard to the second support surfaces 11b, 12b and 13b which are mounted to a rigid plate 14 to maintain the elastomer legs of the triad in an orientation wherein all the elastomer legs cantilever inward from the rigid plate 14. A second ridge plate could be mounted to support surface 11a, 12a, and 13a to provide for mechanical connection to a housing that is to be supported and isolated from shock and vibration. In the preferred embodiment of triad 10 the bottom surfaces 11b, 12b and 13b are bonded to plate 14 to maintain the spaced and angular orientation of legs 11, 12 and 13. In the embodiments shown the first and second support surfaces of each of the legs 11, 12 and 13 comprise offset but parallel, spaced-apart surfaces.

In the embodiments shown the triad 11 comprises a one-piece shock isolator with the first elastomer leg 11, second elastomer leg 12 and third elastomer leg 13 formed to each other through a common hexagonal shaped support surface which is formed by the lateral positioning of surfaces 11a, 12a and 13a. In an alternate embodiment the top surfaces 11a, 12a and 13a could be maintained in a separate condition and a rigid plate or the like could be attracted to each of the surfaces to secure the top end of each of legs 11, 12 and 13 in a fixed condition.

Figure 2:
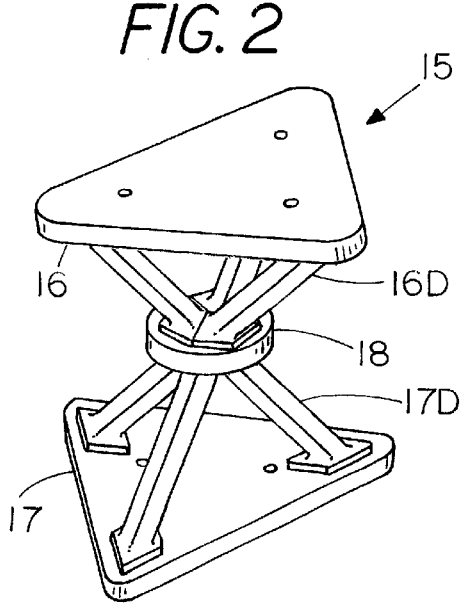
FIG. 2 is a perspective view of a two-triad shock isolator for providing offset support and shock isolation.

FIG. 2 shows a two-triad shock isolator 15 comprises of an upper triad isolator 16 and a lower triad isolator 17. In the embodiment shown a plate 18 extends between the apex end 16d of triad 16 and the apex end 17d of triad 17 to hold the triad shock isolators 16 and 17 in an end to end condition or series relationship. The two-triad shock isolator 15 provides axial offset compressive support while at the same time providing necessary shock and vibration attenuation characteristics. As each of the components of triad 16 and 17 are identical to the component of triad 10 they will not be described herein.

Figure 3:
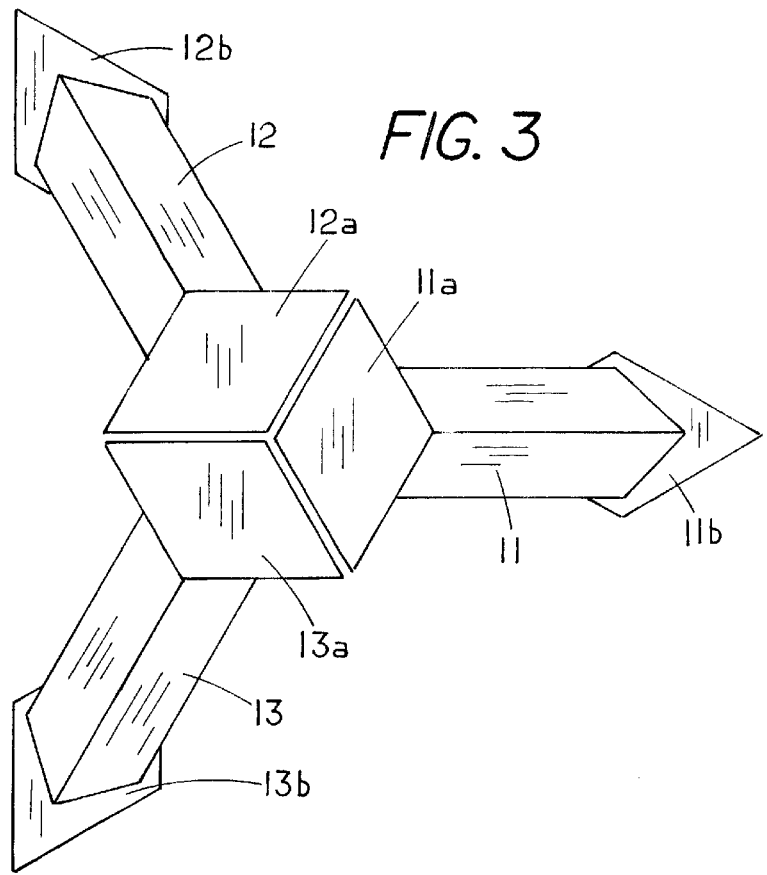
FIG. 3 is a top view showing a triad shock isolator with each of the legs of the triad shock isolator extending outwardly.

FIG. 3 is a top view illustrating the method of making a triad wherein each of three legs 11, 12 and 13 are circumferentially positioned 120 degrees from each other with each of the top mating surfaces 11a, 12a and 13a extending over an angle of 120 degrees so that when joined they form a single surface. Note, from a top view each of the top surfaces 11a, 12a or 12b are laterally offset from each of the bottom support surfaces 11b, 12, and 13b.

Figure 4:
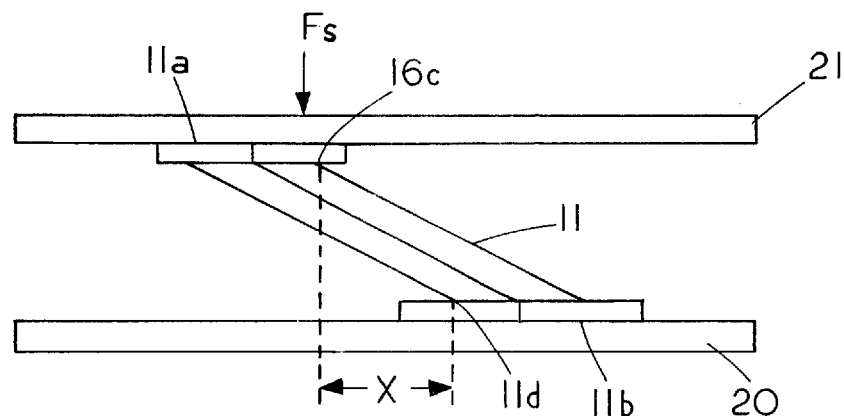
FIG. 4 is a side view of one of the legs of the triad shock isolator of FIG. 1.

FIG. 4 shows a single elastomer leg 11 in isolation to illustrate the compressive axial offset support which results in cantilever support A rigid plate 21 is secured to top surface 11a and a rigid plate 20 is secured to bottom surface 11b. Leg 11 extends angularly between surface 11a and 11b. The edge of leg 11, which is proximate the acute angle formed with surface 11a, is denoted by reference numeral 11c and the edge, which is proximate the acute angle formed with surface 11a is denoted by reference numeral 11d. The lateral distance separating edge 11c and 11d is denoted by the distance "x". If the distance "x" is greater or equal to zero a force $F_s$ on plate 21 is cantileverly supported by elastomer leg 11. That is, there is no direct axial compressive axis, instead the forces must be transferred through an axial offset axis. With this offset arrangement of the top surface 11a and bottom surface 11b the resistance to force $F_s$ is due to the cantilever action of leg 11 and not due to a direct axial compression of leg 11. By having multiple legs angularly positioned one can provide a dynamic isolation of shock while at the same time providing static support. That is the cantilever legs 11 can support a constant force, such as the weight of a housing while also responding to shock and vibration forces.

Figure 5:
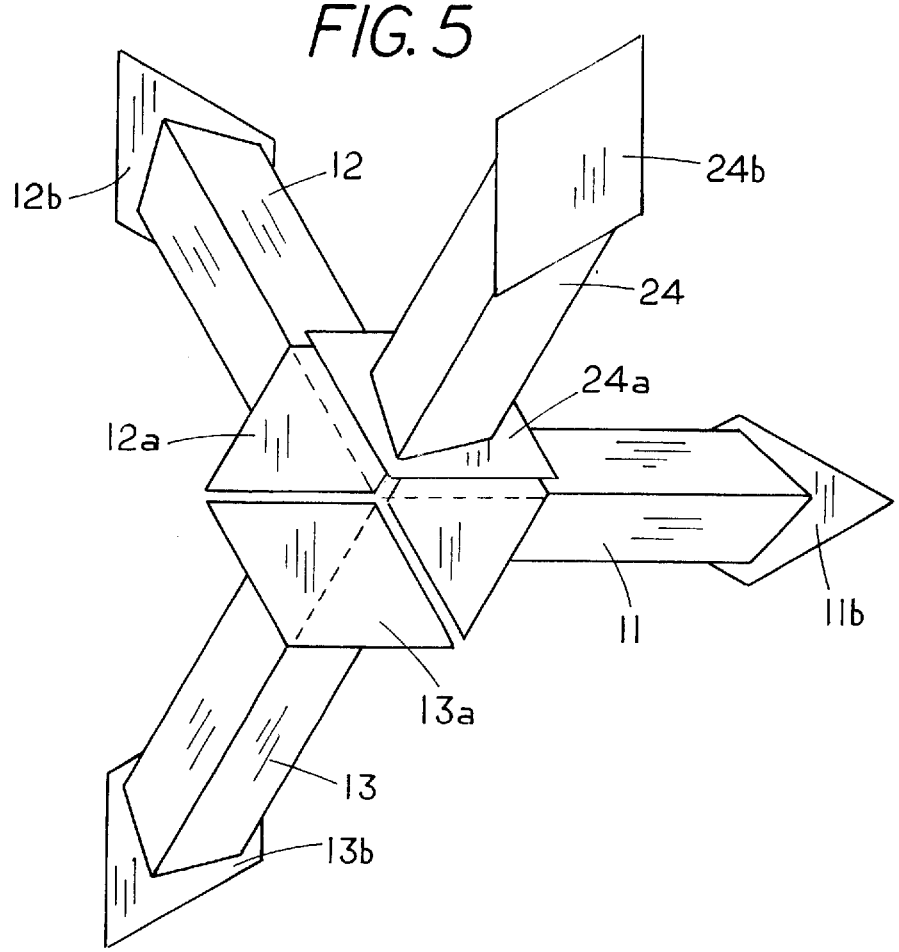
FIG. 5 is a top view of a triad shock isolator with a fourth leg being secured to a portion of the mounting surfaces or two of the three legs of the triad shock isolator.

FIG. 5 shows a top view of the triad of FIG. 3 with elastomer legs 11, 12 and 13 positioned with the top surfaces 11a, 12, and 13a projecting upward. In order to illustrate the angular positioning of a second triad an elastomer leg 24 of a second triad is positioned with top surface 24a engaging two top surfaces. That is, elastomer leg 24 has top surface 24a secured to a portion of top surface 12a and a portion of top surface 11a. Similarly, (not shown) a fifth elastomer leg engages mounting surfaces 12a and 13a and a sixth elastomer leg (not shown) engages mounting surfaces 13a and 11a to complete the second triad. With this rotational positioning of each of the elastomer legs with respect to each other as well as angularly spacing from each other ensures that a two-triad isolator provides an axial offset support from one end to the other end as is evident by legs of the triad which diverge outward from the center portion of the two-triad isolator 15 shown in FIG. 2.

Figure 6:
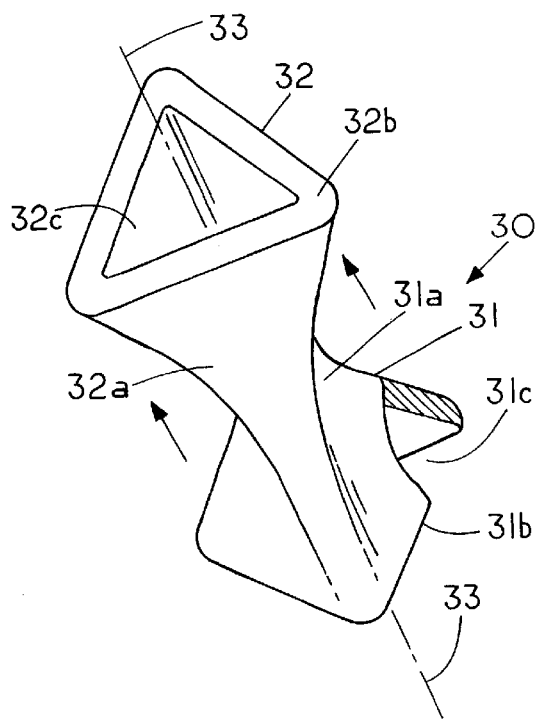
FIG. 6 is perspective view of a two-tetrahedron shock isolator.

FIG. 6 shows an alternate embodiment of an isolator 30 providing shock and vibration attention while providing axially offset support. Isolator 30 is a two-tetrahedron shock isolator 30 for simultaneously isolating shocks and for supporting a static load. Tetrahedron shock isolator 30 comprises an elastomer material, having a set of integral side walls forming a first tetrahedron isolator 31 with a tetrahedron shaped cavity 31c therein and a second tetrahedron shock isolator 32 with a tetrahedron shaped cavity 32c therein. A central axis 33 is shown extending through an apex end 32a and an apex end 31a. Apex end 31a and apex end 32a are smoothly joined to each other to form a one-piece two-tetrahedron shock isolator. The top tetrahedron isolator 32 has a triangular shaped base end for forming a first support surface 32b. Similarly, the bottom tetrahedron isolator 31 has a triangular shaped base end for forming a second support surface 31b. The conjunction of the two-tetrahedron isolator provides an integral force transfer region with both the triangular shaped base ends 31a and 32a of the two-tetrahedron isolator 31 and 32 laterally offset with respect to the minimum cross-sectional area which occurs at the apex conjunction of the tetrahedron shock isolator 31 and 32. That is, a line parallel to axis 33 that extends through first support surface 32b does not extend through the conjoined region between the apex of the two-tetrahedron isolators 31 and 32. Similarly, a line parallel to axis 33 that extends through the second support surface 31b does not extend through the conjoined region between the two apexes of the two-tetrahedron isolators 31 and 32.

Figure 7:
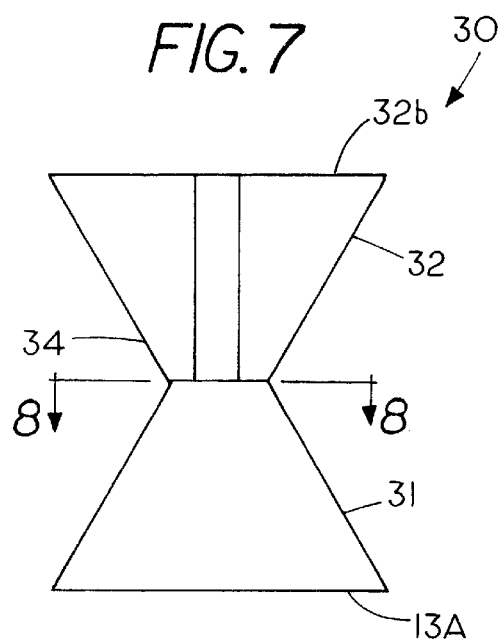
FIG. 7 is a side view of the two-tetrahedron shock isolator of FIG. 6.

FIGS. 7 shows a side elevation view of two-tetrahedron shock isolator 30 with a section line 8—8 extending though the conjoined region 34 between the two-tetrahedron shock isolators 31 and 32. FIG. 7 illustrates the rotational positioning of the top tetrahedron 32 with respect to the bottom tetrahedron 31.

Figure 7A:
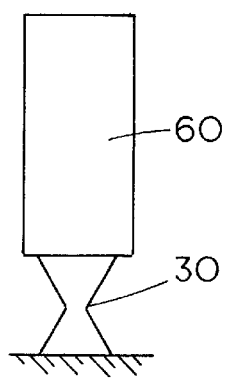
FIG. 7a is a front elevation view showing the two-tetrahedron shock isolator of FIG. 6 supporting the weight of a cabinet or housing.

FIG. 7a shows the two-tetrahedron shock isolator 30 supporting the static weight of a housing 60, which contains equipment to be protected from shock and vibration. It will be noted that a single shock isolator 30 can provide unpaired support for the housing while at the same time provide the proper shock and vibration attenuation characteristics.

Figure 8:
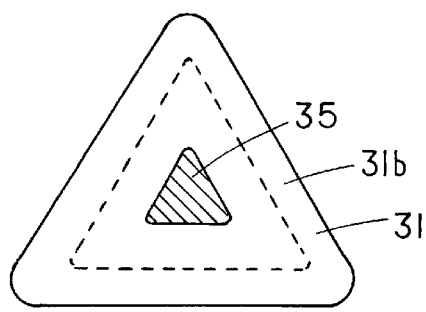
FIG. 8 is a sectional view taken along lines 8—8 of FIG. 7.

FIG. 8 illustrates the lower tetrahedron shock isolator 31 showing the cross section area 35 of minimum area where forces are transferred between the two-tetrahedron shock isolators 31 and 32. For illustrative purposes the outline of the bottom support surface 31b is shown in dotted lines. As evident from the Figure the area 35 is laterally offset from the outer triangular shaped area 31b that forms the bottom support for shock isolator 31.

Figure 9:
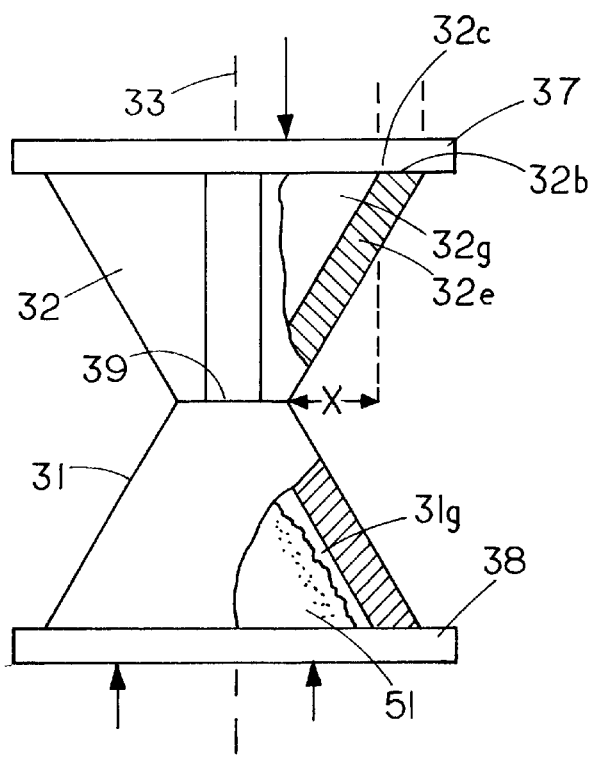
FIG. 9 is a partial cross sectional view illustrating the cavities within the tetrahedron shock isolator of FIG. 6.

FIG. 9 illustrates the two-tetrahedron shock isolator 30 with a first rigid plate 37 attached the base of tetrahedron shock isolator 32 and a second rigid plate 38 secured to the base end of tetrahedron shock isolator 31. A wall 32e extends angularly upward and engages plate at position 32c. The base, a position denoted by 32c, defines an inner boundary or inner periphery of the support surface 32b of tetrahedron shock isolator 32. The lateral distance of the conjoined region of minimum area 39 from the inner periphery of tetrahedron shock isolator 32 is denoted by "x" with the distance x equal to or greater than 0 to thereby provide a cantilever support That is the lateral offset of the base end from the apex end prevents the sidewalls from acting in an axial compression mode. Instead the side walls provide compression support through an axial offset support that allows the walls of each of the two-tetrahedron shock isolators to move circumferentially inwards and outwards in response to dynamic forces.

Figure 10:
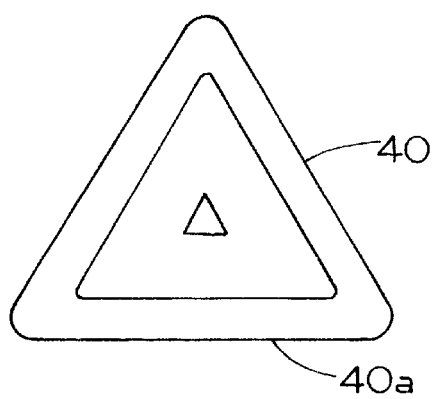
FIG. 10 is a top view of a single tetrahedron shock isolator.
Figure 11:
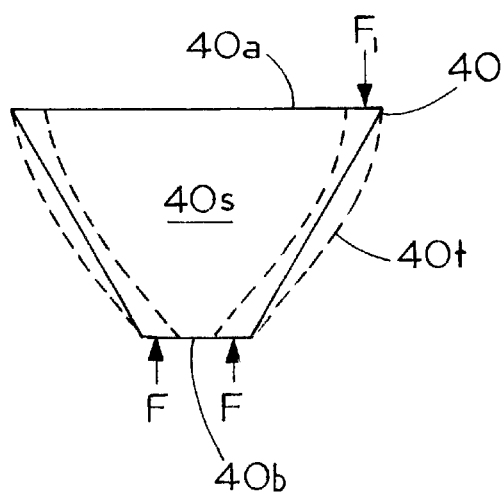
FIG. 11 is a side view of the single tetrahedron shock isolator of FIG. 10 illustrating the radial or circumferential expansion of the side walls of the tetrahedron shock isolator when a shock occurs.

FIG. 10 shows a top view of single tetrahedron shock isolator 40 and FIG. 11 shows a front elation view of single tetrahedron shock isolator 40. To illustrate the operation of forces a first force $F_1$ acts on surface 40a and a second force F acts on surface 40b. The compressive forces on tetrahedron shock isolator 40 does not result in pure axial compression of sidewall 40s but instead produces axial offset compression which results in the bulging or outward expansion of side walls 40s as indicated by the dotted lines 40t. That is, as the forces causes the side walls 40s to bulge outward instead of absorbing the force by direct axial compression. The reliance on a tetrahedron shock isolator which supports static forces thereon in an axial offset compression mode allows the tetrahedron shock isolator to properly respond to shock and vibration forces.

Figure 12:
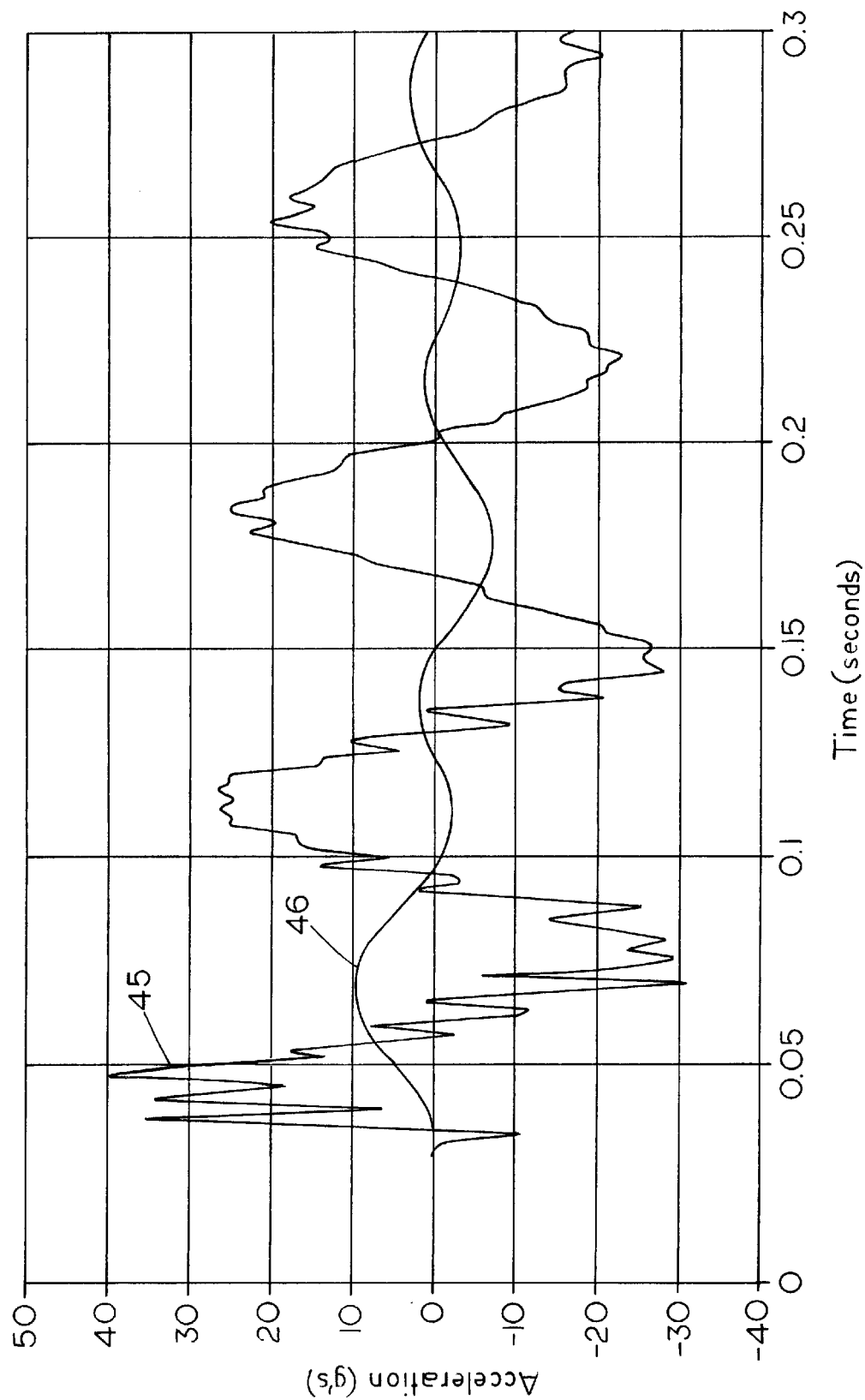
FIG. 12 is a graph illustrating the shock and vibration attenuation of the shock isolator of FIG. 6 in response to external shock and vibration forces.

To illustrate the effect of external shocks on tetrahedron shock isolator 30, which provides axially offset compressive support but not axial compressive support, reference should be made to FIG. 12 which shows acceleration in gravitational units or "g" plotted on the y axis and time plotted on the x axis. Curve 45 illustrates the g forces or shock forces applied to one end of the tetrahedron shock isolator 30 and curve 46 illustrates the corresponding shock forces felt at the opposite end of tetrahedron shock isolator 30. It is apparent that the attenuation is substantial with the initial shock being attenuated by 30g. Thus, the shock isolator of the present invention can both support a static load and provide excellent shock and vibration attenuation characteristics.

The present invention also provides a method of the method of making a shock isolator to simultaneously provide compression support and shock isolation by molding an elastomer into a shape of a first tetrahedron 32 having an internal cavity 32g and a second tetrahedron 31 having an internal cavity 31g with an apex end of the first tetrahedron 32 integrally molded to the apex end of the second tetrahedron 31 to form a one-piece shock isolator.

In order to provide axially offset compressive force while providing shock and vibration attenuation one rotationally positions first tetrahedron 32 with respect to the second tetrahedron 31. In addition the support surfaces of each tetrahedron are laterally offset from each other to provides a shock isolator that can support a static load and also isolate shock and vibration forces from the housing by eliminating a direct axial compression path through the shock isolator. If desired a damping material 51 such as a high density resilient material, as shown in FIG. 9, can be placed in the cavity to alter the damping characteristics of the shock isolator. For example, a damping material comprises particles of tungsten carbide or the like can be placed in the cavity.

By placing the shock isolator 30 underneath the housing 60 as illustrated in FIG. 7a shock isolator 30 not only supports the weight of the housing 60 but attenuates shock and vibration forces that may normally be transmitted to the housing through the support.

We claim:

1. A shock isolator for simultaneously isolating shocks and for supporting a static load comprising:

a first tetrahedron isolator having a set of side walls with a cavity therein, said first tetrahedron isolator having a central axis and an apex end for forming a first support surface and a base end for forming a second support surface with said first support surface and said second support surface laterally positioned with respect to each other so that a line parallel to said axis and extending through said first support surface does not extend through said second support surface and vice versa; and a second tetrahedron isolator having a set of side wails with a cavity therein, said second tetrahedron isolator having a central axis and an apex end for forming a first support surface and a base end for forming a second support surface with said first support surface and said second support surface of the second tetrahedron isolator laterally positioned with respect to each other so that a line parallel to said central axis of said second tetrahedron isolator and extending through said first support surface of said second tetrahedron isolator does not extend through said second support surface of said second tetrahedron isolator and vice versa, the apex end of said second tetrahedron isolator secured to the apex end of said first tetrahedron isolator with the second tetrahedron isolator rotationally positioned with respect to the first tetrahedron isolator so that the base member of said second tetrahedron isolator is rotationally positioned with respect to the base member of said first tetrahedron isolator to thereby provide serially axial support.

2. The shock isolator of claim 1, wherein the second tetrahedron isolator is identical to the first tetrahedron isolator.

3. The shock isolator of claim 1, wherein the first tetrahedron isolator and the second tetrahedron isolator comprise one-piece with the first tetrahedron isolator apex end joined to the second tetrahedron isolator apex end.

4. The shock isolator of claim 1, wherein the cavity in said first isolator and the cavity in said second isolator comprises a tetrahedron shaped cavity.

5. The shock isolator of claim 1, wherein at least one of said cavities includes a damping material.

6. A one-piece shock isolator comprising:
a first elastomer tetrahedron having an apex and a triangular shaped base and a second elastomer tetrahedron having a triangular shaped base and an apex conjoined to the apex of the first elastomer tetrahedron with the triangular shaped base of said first elastomer tetrahedron and the triangular shaped base of said second elastomer tetrahedron rotationally offset from each other.

7. The one-piece isolator of claim 6 wherein the triangular shaped base of the first elastomer tetrahedron and the triangular shaped base of the second elastomer tetrahedron are larger than the apex of either of the first elastomer tetrahedron or the second elastomer tetrahedron so that a line parallel to a central axis and extending through either the triangular shaped base of said first elastomer tetrahedron and said second elastomer tetrahedron does not extend through the conjoined apex of either the first elastomer tetrahedron or the second elastomer tetrahedron.

8. The one-piece shock isolator of claim 6, wherein each of the elastomer tetrahedrons have a tetrahedron shaped cavity therein.

9. The once-piece shock isolator of claim 6, wherein the conjoined apex of the first elastomer tetrahedron and the second elastomer provide a force transfer region between the first triangular shaped base and the second triangular shaped base.

10. The once-piece shock isolator of claim 6, wherein a junction of a first side wall and a second side wall of said first elastomer and a junction of a first side wall and a second side wall of said second elastomer tetrahedron are rotationally offset from one another.

11. The method of making a shock isolator to simultaneously provide compression support and shock isolation comprising:
molding an elastomer into a shape of a first tetrahedron isolator having an internal cavity and a second tetrahedron isolator having an internal cavity with an apex end of said first tetrahedron isolator integrally molded to said apex end of said second tetrahedron isolator to form a one-piece shock isolator including a step of placing a damping material comprising particles of tungsten carbide in each of the cavities of the elastomeric isolators.

12. The method of claim 11, including the step of rotationally positioning the first tetrahedron isolator with respect to the second tetrahedron isolator so that a base member of said first tetrahedron isolator is rotationally positioned with respect to a base member of said second tetrahedron isolator.

* * * * *